US011568448B2

(12) United States Patent
Kosai et al.

(10) Patent No.: US 11,568,448 B2
(45) Date of Patent: *Jan. 31, 2023

(54) SYNTHETIC USER PROFILES AND MONITORING ONLINE ADVERTISEMENTS

(71) Applicant: Ad Lightning Inc., Seattle, WA (US)

(72) Inventors: Ryan Kosai, Seattle, WA (US); Michael Galgon, Seattle, WA (US)

(73) Assignee: Ad Lightning Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,809

(22) Filed: Aug. 24, 2021

(65) Prior Publication Data

US 2021/0383435 A1 Dec. 9, 2021

Related U.S. Application Data

(63) Continuation of application No. 16/402,878, filed on May 3, 2019, now Pat. No. 11,132,717, which is a continuation-in-part of application No. 15/439,351, filed on Feb. 22, 2017, now abandoned, and a continuation-in-part of application No. 15/439,475, filed on Feb. 22, 2017, now abandoned.
(Continued)

(51) Int. Cl.
G06Q 30/02 (2012.01)
G06F 16/9535 (2019.01)

(52) U.S. Cl.
CPC ..... *G06Q 30/0269* (2013.01); *G06F 16/9535* (2019.01); *G06Q 30/0255* (2013.01)

(58) Field of Classification Search
CPC ............ G06Q 30/0269; G06Q 30/0255; G06F 16/9535
See application file for complete search history.

(56) References Cited

U.S. PATENT DOCUMENTS 9,003,423 B1 * 4/2015 Rodriguez Valadez .. G06F 9/54
719/310
9,218,267 B1 12/2015 Keller
(Continued)

FOREIGN PATENT DOCUMENTS

WO 2021102470 5/2021

OTHER PUBLICATIONS

Su et al. De-anonymizing Web Browsing Data with Social Networks. Proceedings of the 26th International Conference on www. pp. 12610-1269. (Year: 2017).*
(Continued)

*Primary Examiner* — Michael W Schmucker
*Assistant Examiner* — Christopher C Busch
(74) *Attorney, Agent, or Firm* — Fortem IP LLP; Anthony Johnson; Matthew Lincicum

(57) ABSTRACT

Disclosed are systems and methods for monitoring and policing online advertisements. Content of a website is evaluated and assigned a score. The content evaluated may be either first-party content or third-party content or both. If the score fails predetermined criteria, a report is generated. Synthetic user profiles can be generated using a browser (or other software) to visit a number of predetermined or pseudo-random sites and accumulate user-specific data as it visits each of the sites. The browser stores off the accumulated user-specific data in conjunction with a synthetic user profile.

17 Claims, 13 Drawing Sheets

Related U.S. Application Data

(60) Provisional application No. 62/298,379, filed on Feb. 22, 2016.

(56) References Cited

U.S. PATENT DOCUMENTS

| | | | |
|---|---|---|---|
| 10,826,936 | B2 | 11/2020 | Callahan et al. |
| 11,132,717 | B2 | 9/2021 | Kosai et al. |
| 2008/0091524 | A1 | 4/2008 | Yan et al. |
| 2009/0099920 | A1 | 4/2009 | Aharoni et al. |
| 2009/0307056 | A1 | 12/2009 | Park et al. |
| 2011/0213678 | A1 | 9/2011 | Chorney |
| 2012/0158509 | A1 | 6/2012 | Zivkovic et al. |
| 2013/0124300 | A1 | 5/2013 | Hopwood |
| 2015/0082426 | A1 | 3/2015 | Palan et al. |
| 2015/0326608 | A1 | 11/2015 | Shabtai et al. |
| 2016/0063568 | A1 | 3/2016 | Brill et al. |
| 2016/0261623 | A1 | 9/2016 | Mcclintock et al. |
| 2017/0004221 | A1 | 1/2017 | Olsen |
| 2017/0054739 | A1 | 2/2017 | Wardman et al. |
| 2017/0068964 | A1 | 3/2017 | Gevka et al. |
| 2017/0091351 | A1 | 3/2017 | Namer et al. |
| 2017/0149817 | A1 | 5/2017 | Sharifi Mehr et al. |
| 2017/0243238 | A1 | 8/2017 | Kosai et al. |
| 2018/0012256 | A1 | 1/2018 | Napchi et al. |
| 2021/0044619 | A1 | 2/2021 | Callahan et al. |

OTHER PUBLICATIONS

Jessica Su et al. De-anonymizing Web Browsing Data with Social Networks. In Proceedings of the 26th International Conference on World Wide Web (WWW '17). International World Wide Web Conferences Steering Committee, Republic and Canton of Geneva, CHE, pp. 1261-1269. (Year: 2017).*

AutoBLG: Automatic URL Blacklist Generator Using Search Space Expansion and Filters 20th IEEE Symposium on Computers and Communication (ISCC) pp. 625-631 (Year: 2015).

How Retailers Can Optimize Campaigns With Dynamic Search Ads https://www.cpcstrategy.com/blog/2015/08/dynamic-search-ads/ (Year: 2015).

International Search Report and Written Opinion dated Feb. 9, 2021, International Application No. PCT/US20/70809, 15 pages.

* cited by examiner

SYNTHETIC USER PROFILES AND MONITORING ONLINE ADVERTISEMENTS

CROSS-REFERENCE TO RELATED APPLICATIONS

This application is a continuation of U.S. patent application Ser. No. 16/402,878, filed May 3, 2019, which is a continuation-in-part of U.S. patent application Ser. No. 15/439,351, filed Feb. 22, 2017, and is a continuation-in-part of U.S. patent application Ser. No. 15/439,475, filed Feb. 22, 2017, each of which claims priority to U.S. Provisional Application No. 62/298,379, filed Feb. 22, 2016. Each of the aforementioned applications is incorporated by reference herein in its entirety.

TECHNICAL FIELD

The disclosed subject matter pertains generally to the area of online communications, and more specifically to the area of data used in tracking the browsing habits of individuals, and monitoring and policing online advertisements.

BACKGROUND

Web developers are constantly seeking new ways to improve the usability, effectiveness, and appropriateness of the websites they develop. Testing, monitoring, and policing the content served from a website is an ongoing effort. In addition, online technology enables targeted ads based on a visitor's browsing history. Similarly, many websites are configured to implement user-specific data for a website visitor. A web "cookie" is one specific example of user-specific data. Cookies are delivered to a visitor's browser software and are used as a simple tool to persist data between browsing sessions. User-specific data helps a website to tailor the experience for different visitors to the website. Cookies are but one of many different types of user-specific data. A technique for evaluating a website while accounting for user-specific data has eluded those skilled in the art, until now.

Online content providers often engage third-party advertising affiliates to present advertisements ("ads") on the websites of the content providers. For example, the host of a successful website may receive a high number of page views per month, thereby creating a desirable platform for advertising. Online technology enables targeted ads based on a visitor's browsing history. However, successful content providers rarely desire to dedicate resources to the task of managing a targeted advertising platform. Accordingly, content providers typically engage advertising affiliates to acquire and curate the advertisements that are ultimately displayed on the content provider's website. Problems sometimes arise with such systems because the affiliate may serve ads that are inconsistent with the content provider's image or desires. Similarly, poorly implemented ads may hamper the performance of the content provider's website. Affiliate ads may also create other problems. Currently, there is no efficient tool for policing online advertisements.

SUMMARY

Embodiments are directed to a tool for creating synthetic user profiles. Each synthetic user profile includes user-specific data that approximates the browsing behavior of a particular individual, type of individual, and/or target demographic.

Embodiments are directed to a tool for monitoring online advertisements and policing such advertisements based on a scoring system

BRIEF DESCRIPTION OF THE DRAWINGS

The following detailed description may be better understood with reference to the accompanying drawings, in which like numerals represent like elements throughout the several figures, which are briefly described as follows.

DETAILED DESCRIPTION

Generally described, some embodiments of the disclosure are directed to a tool for creating synthetic user profiles. Each synthetic user profile includes user-specific data that approximates the browsing behavior of a particular individual, type of individual, and/or subject demographic. A profile generator simulates visiting a number of actual websites or other online resources based on an estimate of the browsing behavior of the subject demographic. The profile generator accumulates user-specific data and stores it in a particular synthetic user profile for that subject demographic.

Additionally, some embodiments of the disclosure are directed to a system for monitoring and policing online advertisements. Embodiments implement a tool for monitoring ads served on a website and scoring one or more of the ads. Based on the score of the ads, feedback is reported, such as to a proprietor of the website. In preferred embodiments, the feedback may be used to alter the ads served on the website, in character, in nature, in amount, or the like.

Dynamic Webpages

Figure 1A:
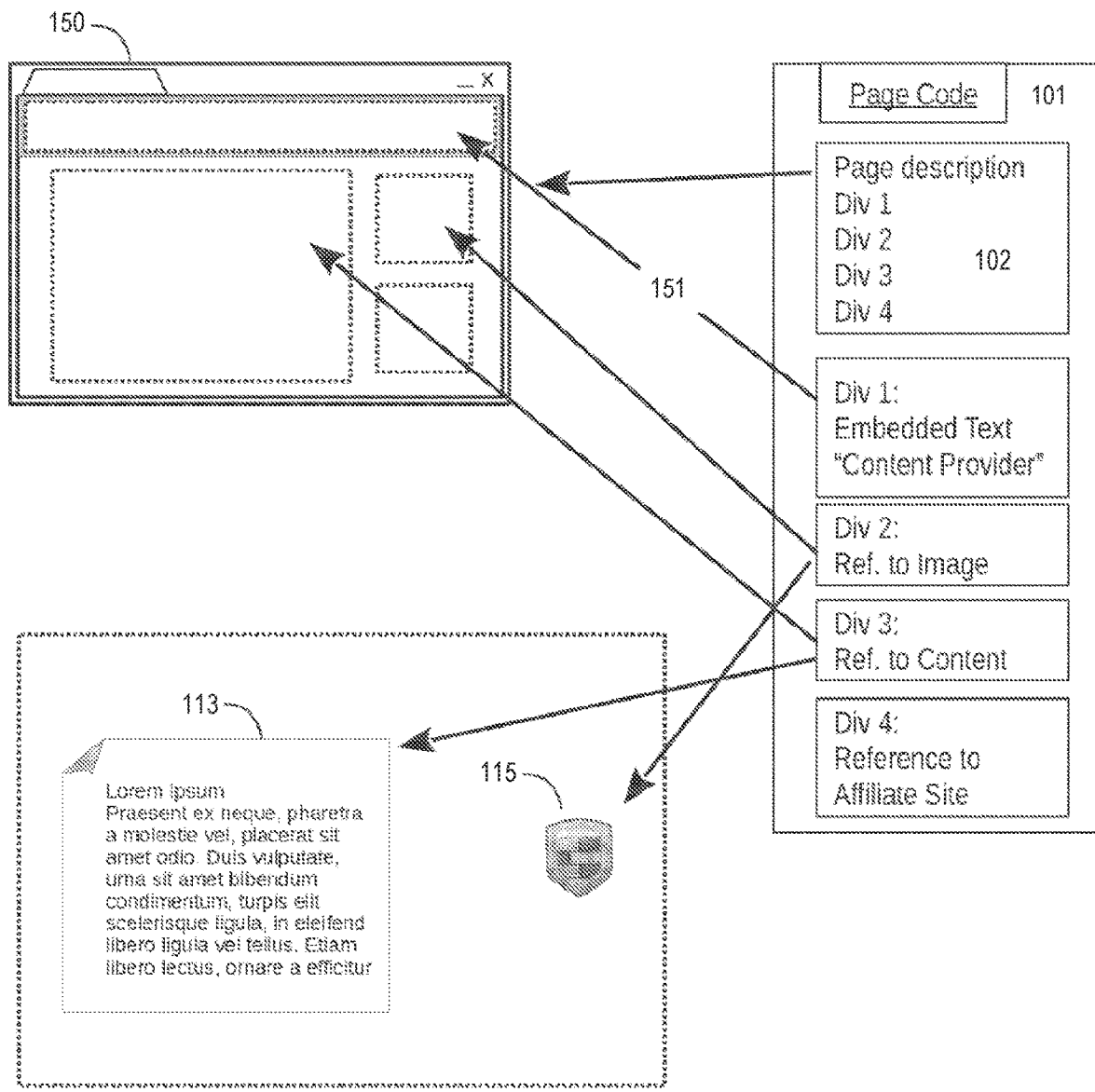
FIGS. 1A and 1B are functional block diagrams generally illustrating the creation of a dynamic webpage having internal and external content, in accordance with the disclosure.

It is helpful to a complete understanding of this disclosure to begin with a general discussion of how dynamic webpages are served by a typical content provider. Turning first to FIG. 1A, a brief discussion of a simple dynamically generated webpage is provided. To begin, a dynamically generated webpage (i.e., page 101) includes code, such as markup language or scripts, that describe a webpage. In this simple example, page 101 includes two general types of code. First is code (e.g., HTML, JavaScript, CSS, or the like) that describes what the rendered page 150 should look like in a visitor's browser. In this example, that code is referred to as "page description" code 102. In this example, page description code 102 defines four regions of the rendered webpage 150 in which content should be displayed.

The second type of code (e.g., HTML, PHP, Perl, JavaScript, or the like) defines or identifies content to be delivered for each of the regions defined by the page description code 102. Generally stated, the content may either be defined directly or by reference. For instance, the page code 101 may itself include content, such as text within the page code 101 itself, to be displayed in a particular region of the rendered page 150. In one example, the text "Content Provider Webpage" may be included directly in page code 101 (e.g., in a paragraph tag or inline) which may be rendered in a header region 151 of the rendered page 150.

Alternatively, content may be defined by reference to another source, such as a text file, database, image file, or the like. Generally stated, a reference may be either local or external. A local reference points to content that is within the common control or domain of the web server that is hosting the page code 101. In other words, for the purpose of this discussion, "local content" refers to any content that is under common control with the web server which is hosting the page code 101. In contrast, an "external reference" refers to a target, such as content, that is in a domain different than the local domain. It is important to note that an external reference may point to a target that is in an external domain under the common control of the local domain, but it need not be. In other words, one entity may control multiple domains which each serve content for the rendered page 150, but additional content may be served from another external domain which is not under the control of that entity. By way of example, textual content 113 may be stored in a first domain (e.g., "ContentProvider.com") and multimedia content 115 may be stored in a second domain (e.g., "ContentProviderImages.com"), both of which are controlled by the same entity. For the purpose of this discussion, both the first domain and the second domain would store "local content."

Figure 1B:
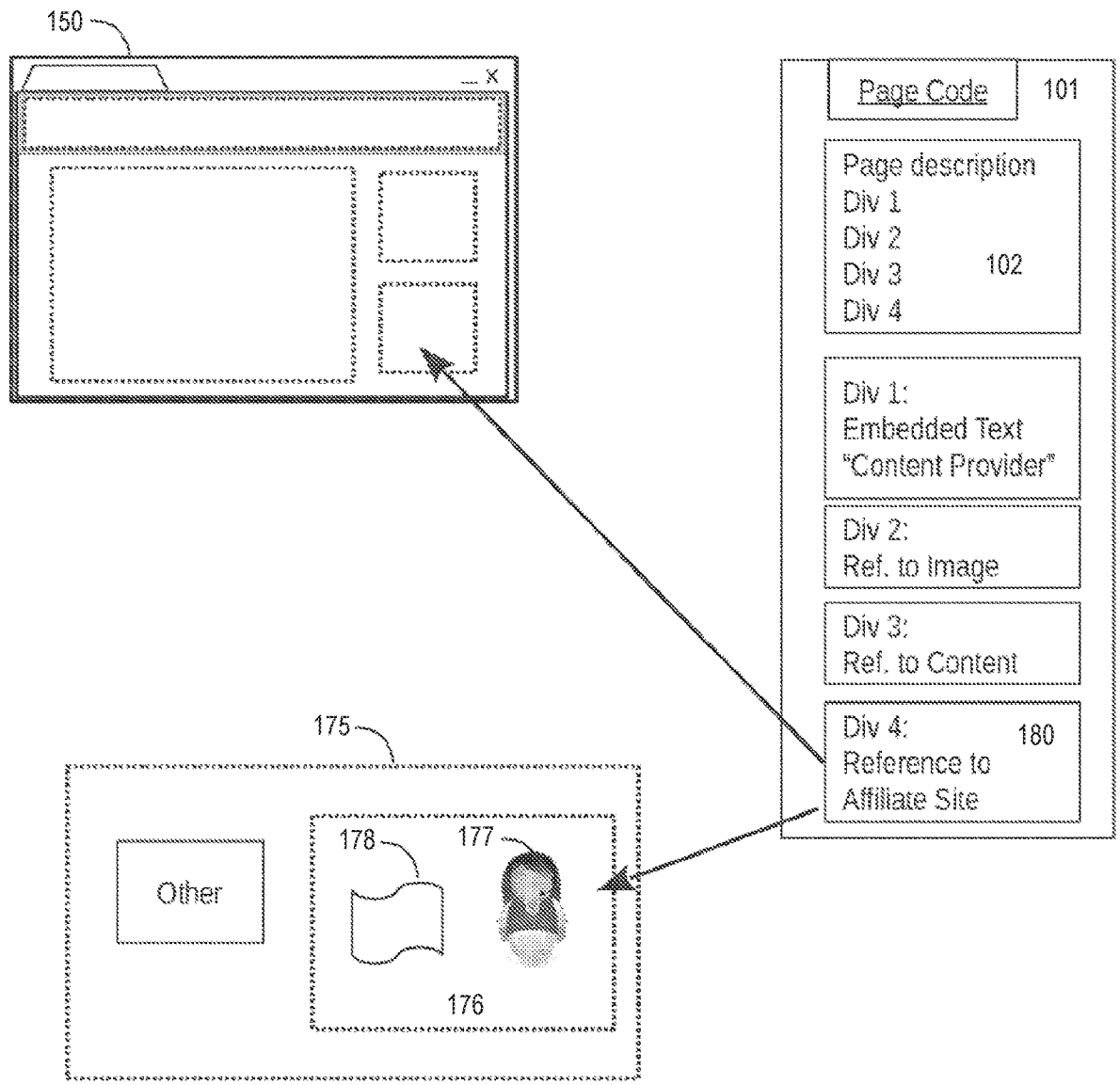

Turning now to FIG. 1B, an example of an external reference to content that is not within the common control of the local domain is illustrated. In the illustrated example, an affiliate or external domain 175 hosts resources 176 which may be referenced (e.g., retrieved for use or invoked programatically) by other entities. The resources 176 may include any one or more of many different content types, such as multimedia content (e.g., ad image 177), code (e.g., script 178) that can be remotely executed, or any other type of resource. The page code 101 includes an affiliate or external reference 180 that points to some resource 176 of the external domain 175. Accordingly, when the page code 101 is requested, each of the several tags and/or references is interpreted and its associated content is returned and displayed as rendered webpage 150 on the requester's browser.

Figure 2:
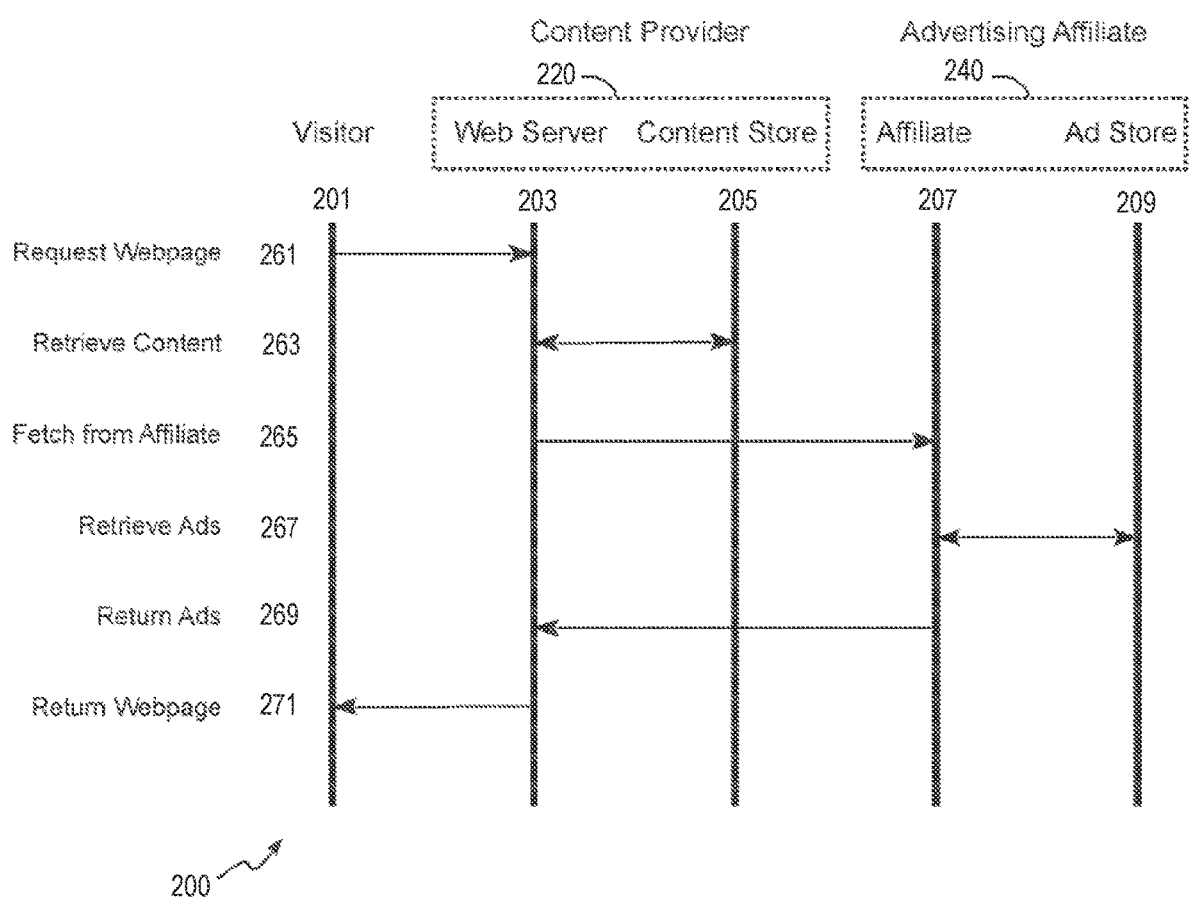
FIG. 2 is a sequence diagram generally illustrating the flow of information between components in an online advertising environment, in accordance with this disclosure.

FIG. 2 is a sequence diagram 200 generally illustrating the flow of data between each of several components to accomplish the generation of a dynamic webpage as just described. The sequence begins when a visitor 201 issues a request 261 for a webpage to a web server 203 of a content provider 220. In this embodiment, the web server 203 prepares to respond to the request 261 by initiating assembly of a dynamic webpage. As noted above, the webpage may include requests for both internal content and external content. Accordingly, the web server 205 may retrieve 263 certain content for the webpage from a content store 205. In this example, the content is under the control of the content provider 220. Thus, the content provider 220 maintains its own quality control standards for that content.

In addition, the web server 203 may also fetch 265 additional information, such as advertisements, from an advertising affiliate 240. The web server 203 may issue a request for an ad to the affiliate 207. The request 265 may include profile information (e.g., user-specific data) that helps identify the visitor 201. Specific examples of such profile information is described in more detail below. The affiliate 207 in turn retrieves 267 the ad from an ad store 209. The selection of which particular ad to retrieve 267 from the ad store 209 is based, at least partially, on the profile information. Once the ad is selected, it is returned 269 to the web server 203, which in turn incorporates it into the requested webpage and returns 271 the webpage to the visitor 201 for rendering on the visitor's browser.

Figure 3:
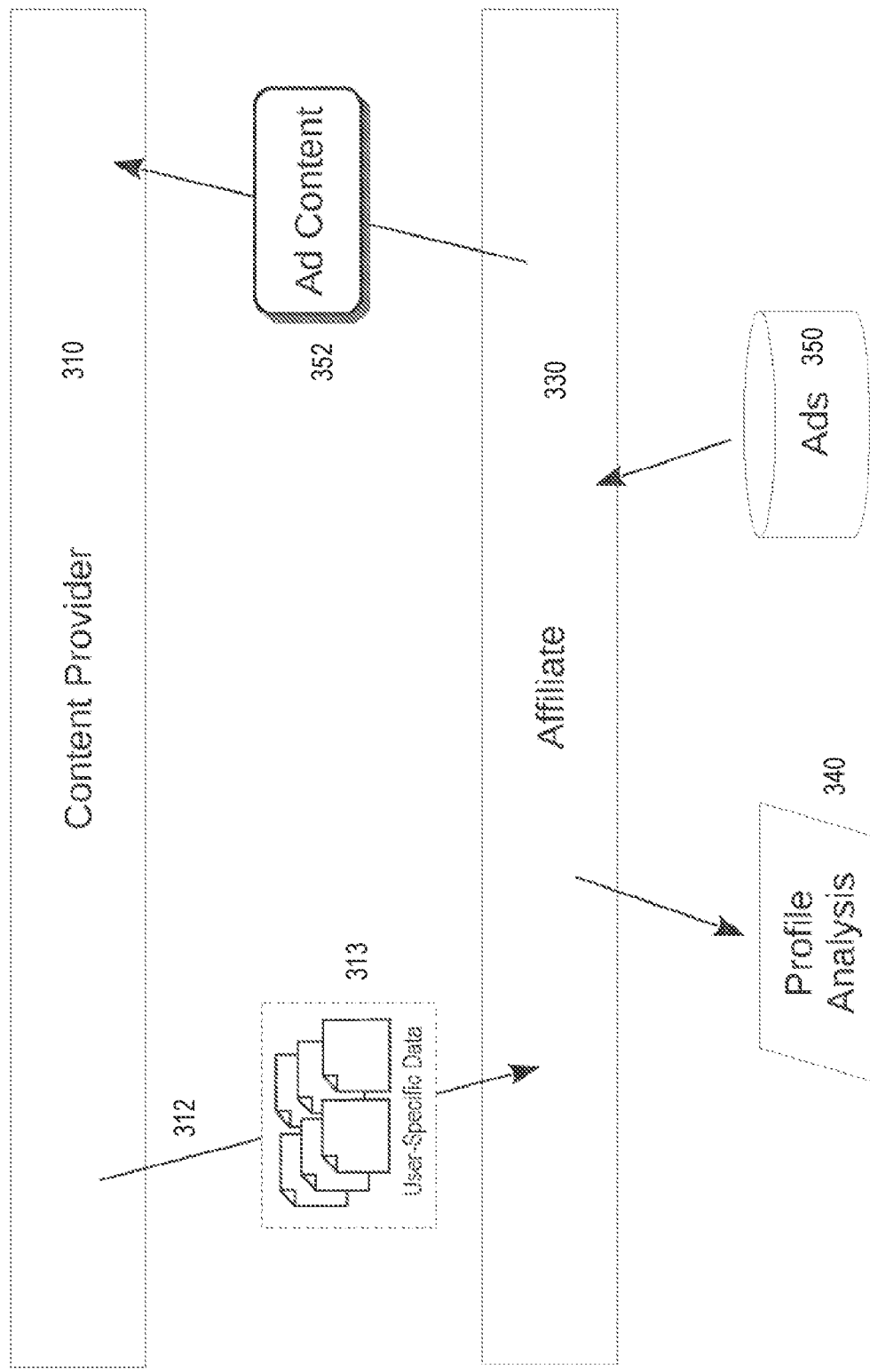
FIG. 3 is a functional block diagram generally illustrating the flow of data between components in an online environment for the creation of dynamic webpages, in accordance with this disclosure.

To complete the discussion, FIG. 3 is a functional block diagram generally illustrating the flow of data between a content provider and an affiliate, in accordance with one embodiment. As illustrated, the content provider 310 may receive a request for a resource (e.g., a webpage) which itself (the requested resource) refers to external content (e.g., an advertisement). In the illustrated example, the requested resource is a webpage that includes a reference to content hosted by an affiliate 330. To service the original request, the content provider 310 issues an ad request 312 and transmits that request to the affiliate 330.

As is known to those skilled in the art, additional information may be transmitted along with the ad request 312. More specifically, certain user-specific data 313 may be transmitted together with the ad request 312. The user-specific data 313 is additional data that helps identify the original requesting entity. Certain specific examples of user-specific data 313 include cookies, web beacons, flash cookies, user-agent strings, referrer headers, information derived from any one or more of the foregoing, or the like. Many more examples will be immediately apparent to those skilled in the art. In short, the user-specific data 313 includes information that helps identify browsing habits or behavior of the requesting individual (or at least the requesting computing system).

The affiliate 330 takes the user-specific data 313 and the ad request 312 and executes a profile analysis 340 to identify a particular ad to return. For instance, the profile analysis 340 may reveal particular browsing habits for the requesting entity or individual which help influence which particular ad from a multiplicity of available ads 350 should he returned. For example, if the user-specific data 313 reveals that the requesting individual had recently been visiting the website of an online shoe store, the profile analysis 340 may suggest that an ad 351 related to shoes is appropriate. In that case, the affiliate 330 would then return ad content 352 to the content provider 310 including the selected ad 351 and perhaps other information, such as updated user-specific data, for example. Alternatively, the ad content 352 could include only the selected ad 351.

Synthetic User Profiles

As noted above, some embodiments of the present disclosure are directed to a tool for creating synthetic user profiles. Each synthetic user profile includes user-specific data that approximates the browsing behavior of a particular individual, type of individual, and/or subject demographic. A profile generator simulates visiting a number of actual websites or other online resources based on an estimate of the browsing behavior of the subject demographic. The profile generator accumulates user-specific data and stores it in a particular synthetic user profile for that subject demographic.

Figure 4:
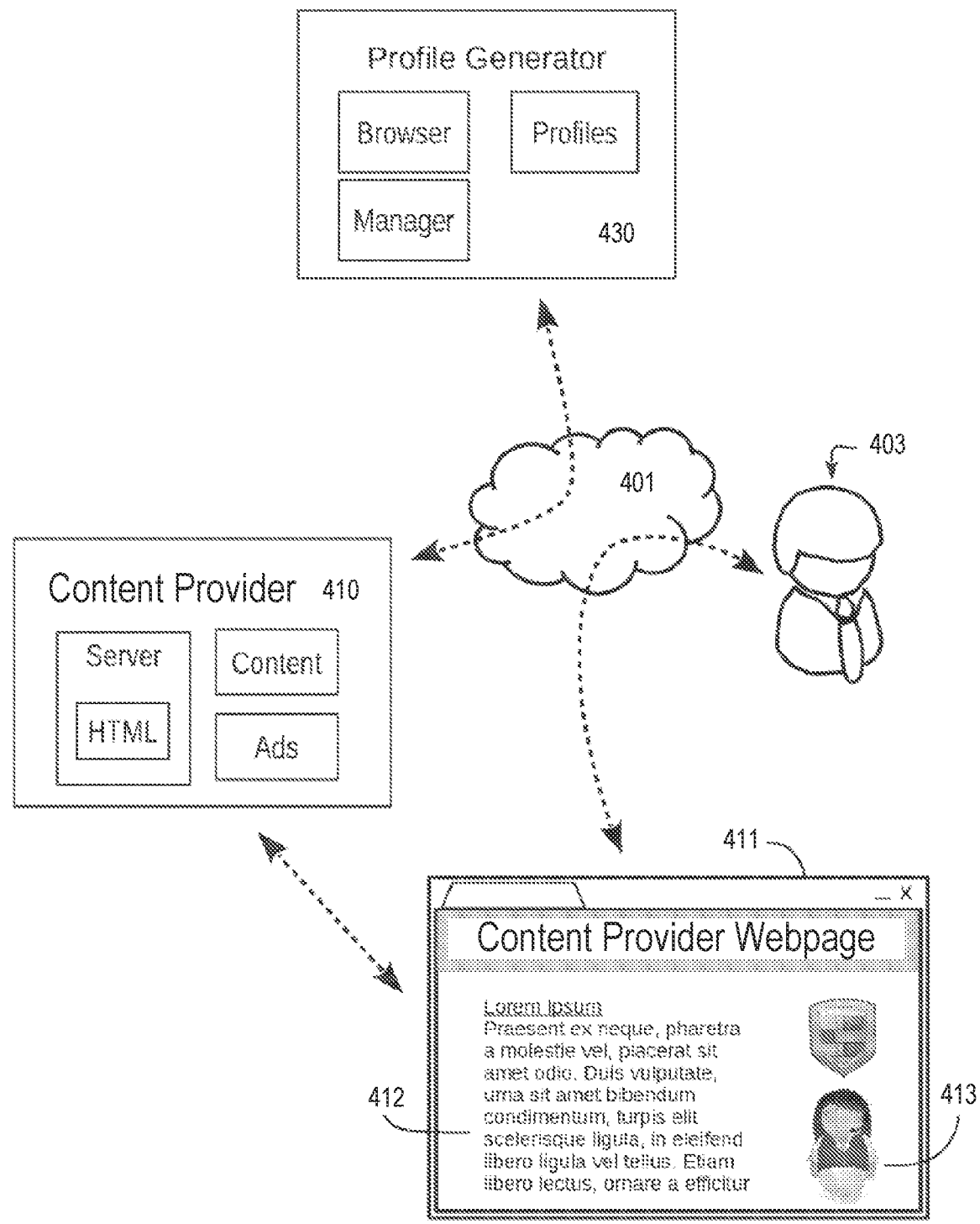
FIG. 4 is a functional block diagram generally illustrating a system for creating synthetic user profiles, in accordance with the disclosure.

FIG. 4 is a functional block diagram generally illustrating an environment in which operates a profile generator constructed in accordance with the teachings of this disclosure. As illustrated, the environment includes at least one or more content providers or publishers (e.g., content provider 410) and a profile generator 430 in communication over a wide area network 401, such as the Internet.

Generally stated, each of the content providers 410 includes a web server for serving content, typically in the form of static or dynamic webpages, constructed using languages such as HTML, PHP, Perl, CGI, ASP, or the like. The content provider 410 may serve up one or more webpages, such as webpage 411. In accordance with implementations of this disclosure, the webpage 411 may include code, such as markup language instructions, that may define both content 412 and ads 413. In one embodiment, the content provider 410 provides (either directly or by a third-party) context-sensitive (targeted) ads 413 to be displayed in conjunction with the content 412 on the publisher's webpage 411.

Appropriate ads 413 may be selected for display on the webpage 411 from a data store of available ads. In one embodiment, particular ads may have associated information that identifies a target audience for each ad. More specifically, data is maintained that associates which type of visitor should receive which types of ads. In other words, a visitor having one particular profile may be more receptive to a particular type of ad, whereas a visitor with a different profile may be more receptive to a different type of ad. Advertising profiles are generally constructed by monitoring the online behavior (e.g., browsing history, search history, purchase history, or the like) of a target demographic.

Accordingly, when a particular visitor lands at the web site 411, the content provider 410 serves up the webpage 411 and makes a determination about which ad (e.g., ad 413) to serve in conjunction with the content 412 from a user-specific data stored on the visitor's (e.g., user 403) computing system. One environment for serving content based on a visitor's web browsing history is illustrated in FIG. 4 and described in detail below. Briefly stated, when the visitor 403 lands on the web site 411, user-specific data is transferred from the visitor 403 to the content provider 410, and the user-specific data is used to select an ad to be served to that visitor 403.

Figure 5:
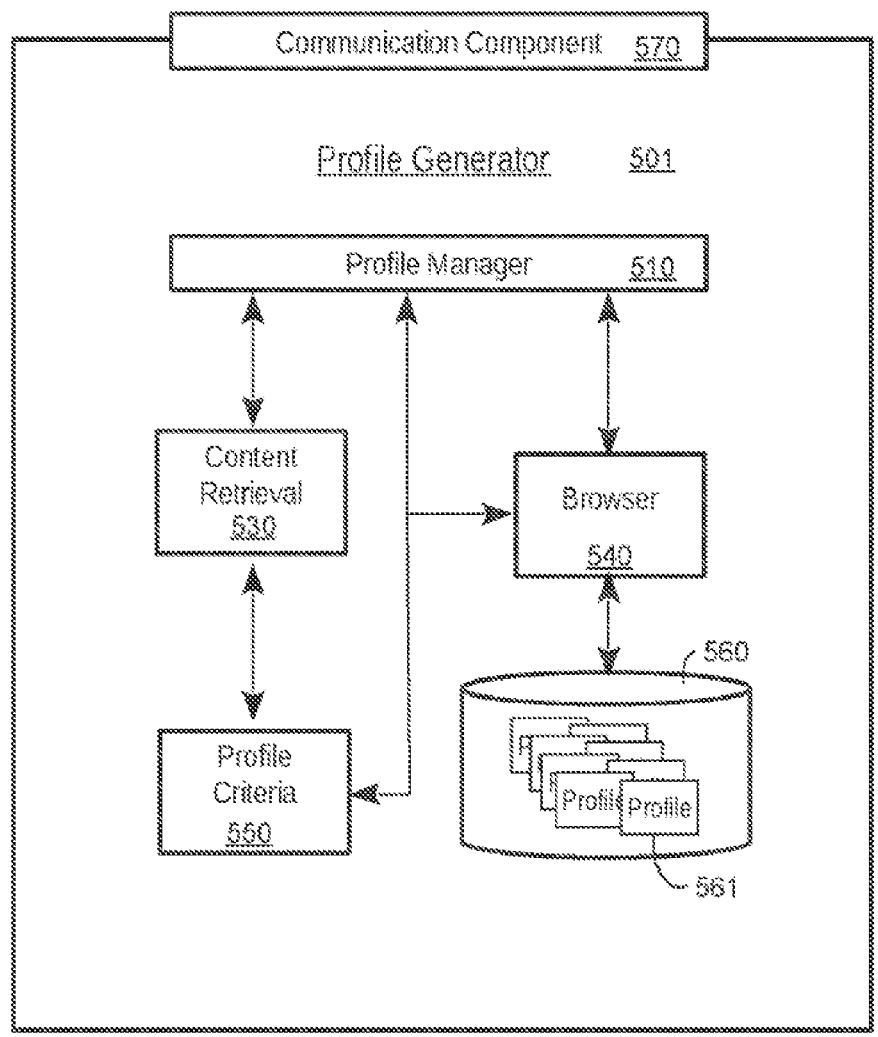
FIG. 5 is a conceptual diagram generally illustrating the creation of a synthetic user profile using a profile generator, constructed in accordance with this disclosure.
Figure 6:
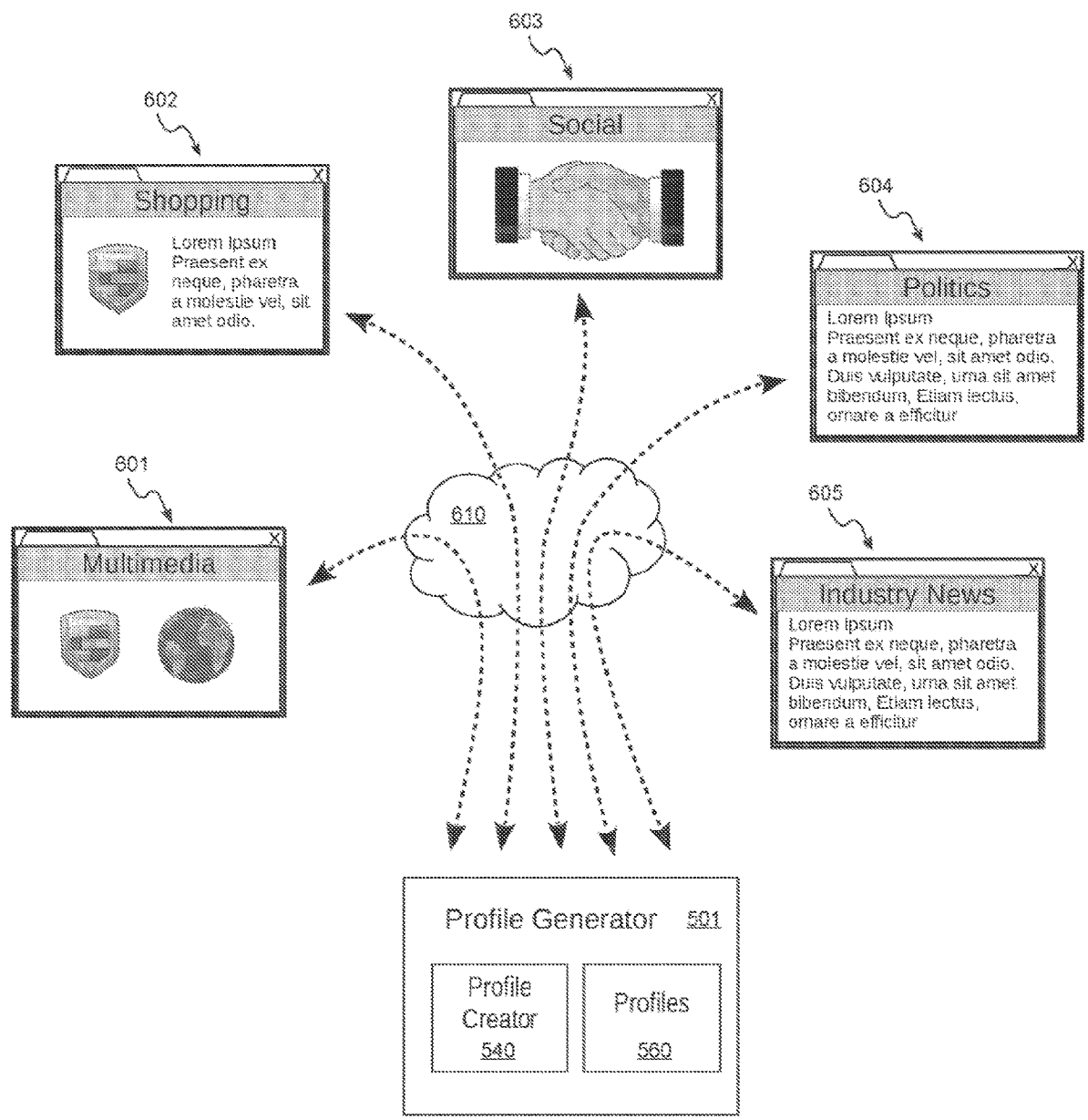
FIG. 6 is a functional block diagram generally illustrating components of a profile monitor constructed in accordance with this disclosure.
Figure 7:
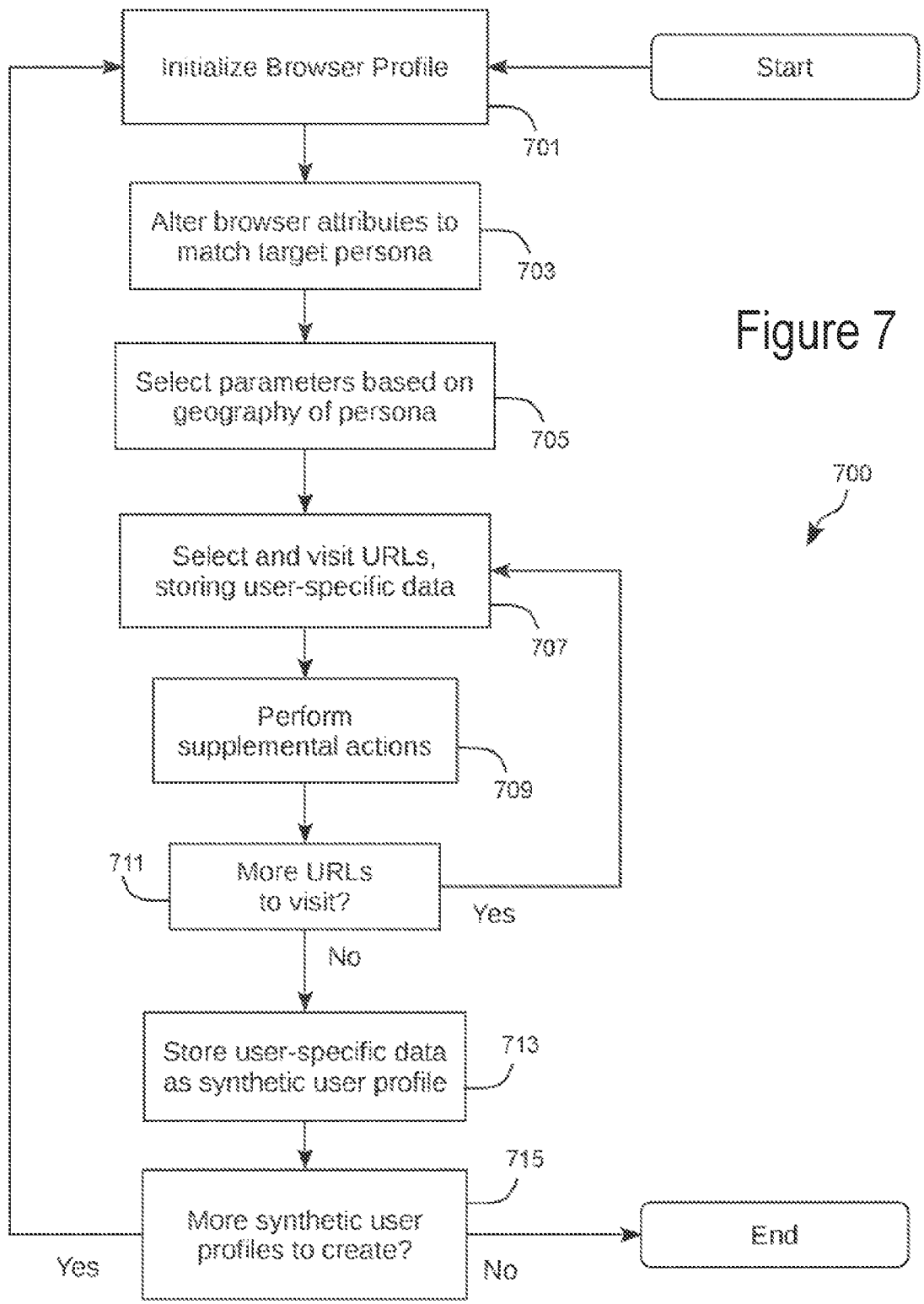
FIG. 7 is a logical flow diagram generally illustrating a system for creating synthetic user profiles, in accordance with certain embodiments.

The profile generator 430 is a tool that, generally stated, assembles one or more synthetic user profiles that each include user-specific data that approximates the browsing behavior of a target demographic. One specific implementation of the profile generator 430 is illustrated in FIGS. 5 and 6, and described below. The profile generator 430 includes a management engine that implements a process for creating synthetic user profiles. Particular details of one preferred process are illustrated in FIG. 7 and described below.

Generally stated, the profile generator 430 builds a synthetic-user profile that simulates a member of the publisher's target audience demographic, such as the visitor 403. The profile generator 430 may build the synthetic-user profile by visiting various sites that ordinary members of the target demographic would be expected to visit. The profile generator 430 repeats this process for numerous websites or other resources and accumulates user-specific data until a sufficient amount of user-specific data has been collected to approximate the browsing behavior of a member of the target demographic.

Figure 12:
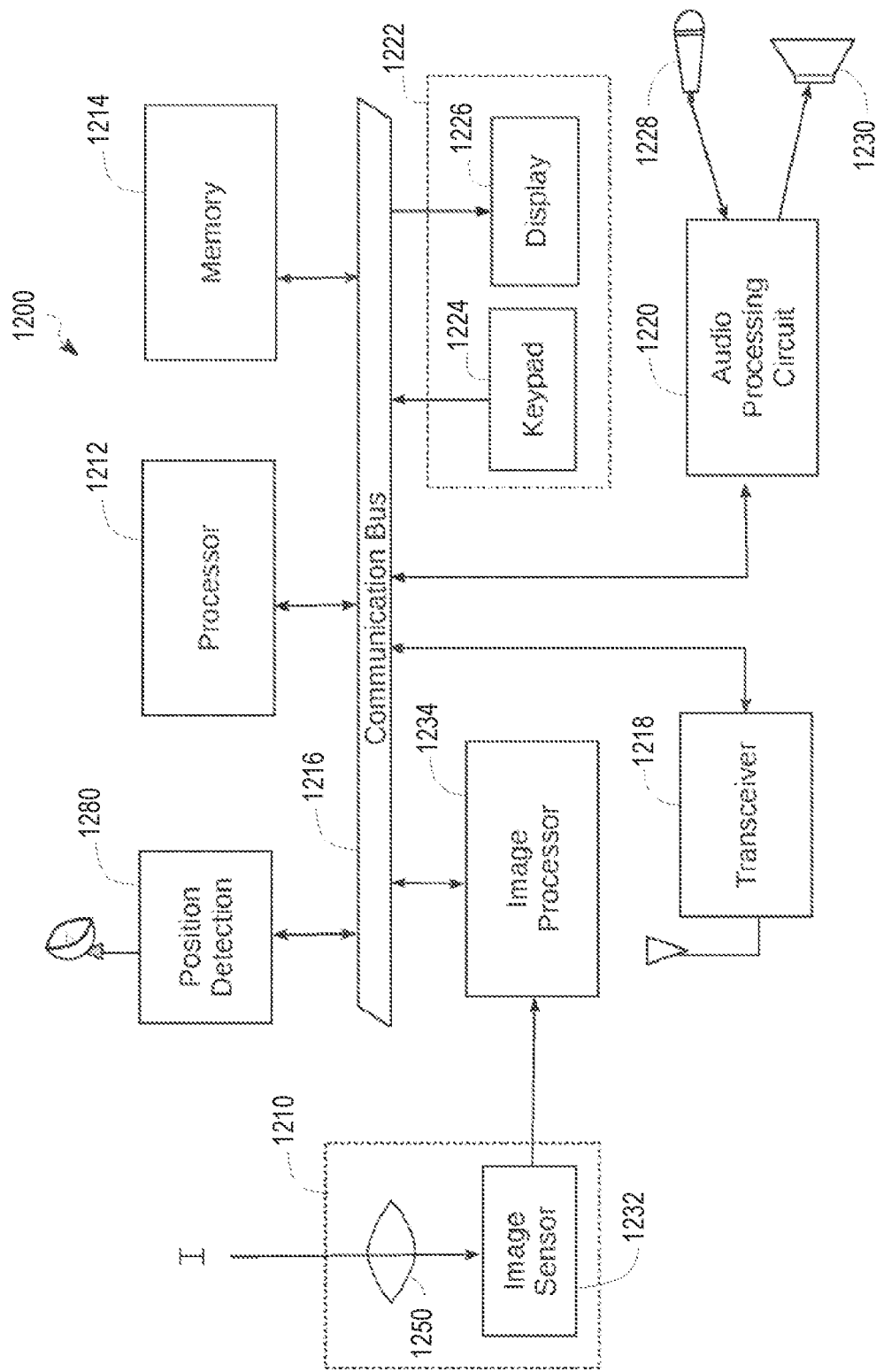
FIG. 12 is a functional block diagram generally illustrating one possible example of a computing device that may be used in various embodiments

Any one or more of the several entities illustrated in FIG. 4 may communicate over the Internet 401 or other publicly accessible wide area network. Although illustrated in quasi-human form, it should be appreciated that the visitor 403 represents a computing device in use by one or more individuals. The computing device may host user-specific data or information, such as cookies, which represents a profile for the individual or individuals. Finally, the several components illustrated in FIG. 4 may be implemented using computing devices, which are generally known. One illustrative computing device that may be used to implement embodiments is illustrated in FIG. 12 and described below.

The several components illustrated in FIG. 4 implement one preferred embodiment for generating synthetic user profiles. Such an embodiment adds value to web developers by enabling the publisher websites to be more easily tested and/or evaluated in the context of one or more target demographics. What follows now is a discussion of additional detail for specific implementations of several of the components introduced in FIG. 4.

Turning now to FIG. 5, illustrated is one embodiment of a profile generator 501 which may be used in various implementations of this disclosure. The preferred embodiment of the profile generator 501 includes a profile manager 510, a communication component 570, a browser 540, and a plurality of synthetic-user profiles 560. The communication component 570 may be any component that facilitates communication between disparate computing devices, such as over a local or wide area network, or the like. In one example, the communication component 570 enables communication between the profile generator 501 and a remote content provider using, for example, the HTTP, HTTP/2, or any HTTP-like communication protocols. A profile manager 510 is configured to facilitate inter-process cooperation and proper operation. The profile manager 510 may also be configured with logic to schedule and marshal various events and tasks among the several components of the profile generator 501. The profile manager 510 of the preferred embodiment may further include administrative control functions.

In this embodiment, the browser 540 is specially configured to retrieve and accumulate user-specific data as synthetic-user profiles. In addition, the browser 540 of this embodiment may be configured to create and manage a plurality of synthetic user profiles 560, such as profile 561. In this embodiment, each profile 560 represents a fabricated browsing history of an imaginary individual. In this embodiment, the browser 540 is configured to simulate the browsing behavior of a real person by performing a multiplicity of activities to simulate an imaginary person performing various activities, such as browsing or searching the Internet. Each of the several synthetic-user profiles may represent the browsing behavior of different types of real people, each of which represents a different target demographic. The profile manager 510 may initialize the browser 540 with one or more cookies (or other persistent data) that contain session or identity data. In one embodiment, the pre-selected set of cookies may contain session data used to signify that a user is logged into a site. In another embodiment, the cookies may contain identifying metadata used by an ad network or exchange.

The profile manager 510 may modify one or more attributes of the browser making the request to simulate attributes of the persona. This may be achieved by methods including, but not limited to modification of the browser software, emulators built into the browser, modification of browser properties via JavaScript, or the like. For example, the HTTP User-Agent header on requests may be modified to simulate browsers other than the selected browser.

The profile manager 510 may select sites to be visited in a number of different ways. For example, profile criteria 550 may identify particular target demographics for desired synthetic user profiles. Particular websites may be selected which align with each particular target demographic and be added to a list of websites to be visited when creating a synthetic user profile for that target demographic. Similarly or alternatively, the profile manager 510 may assemble a user-configured list of domains, a statistically generated list of domains based on demographic or audience data, an expert system with knowledge of categorized domains, a random selection of domains, or a list of top domains for a geography or demographic.

To illustrate the foregoing, and referring briefly to FIG. 6, the profile generator 501 performs a multiplicity of browsing sessions by visiting numerous other websites (e.g., websites 601-605). The browser 540 is configured to access each of the websites using browsing software that accumulates user-specific data from each website. For instance, the browser 540 may visit website 601, which may be a multimedia rich website with lots of content pertaining to entertainment, for example. By visiting website 601, the browser 540 accumulates whatever cookies and other user-specific data may be set by website 601 browser 540 may also visit website 604, which may be a blog site having political content affiliated with a particular political party, for example. Accordingly, the browser 540 accumulates whatever user-specific data may be set by website 604. The browser 540 repeats this behavior for numerous different and varying websites having different and varying characteristics and, thereby, accumulates user-specific data corresponding to a particular browsing history or pattern. The user-specific data accumulated during such browsing session is stored in a specific profile 560.

The browser 540 may repeat the foregoing operations to generate different synthetic-user profiles 560. In one embodiment, the visited websites may be selected via a variety of means, including random sampling of top websites, or targeted based on a particular demographic group. Alternatively or additionally, the visited websites may be selected to simulate the expected browsing behavior of a target demographic. For example, the profile generator 501 may be tasked with creating one user profile simulating the browsing characteristics of a mature individual and another user profile simulating the browsing characteristics of a young adult. In such a scenario, different browsing criteria may be specified to generate different profiles. For instance, a young adult may be more likely to visit a social network website 603 and a multimedia website 601, whereas a mature individual may be more interested in an industry news website 605 and a political blog 604. However, similarities are also likely. For instance, both individuals may also be interested in a shopping website 602. Accordingly, different user profiles 560 may be generated by specifying different browsing patterns which the browser 540 may execute.

The foregoing discussion speaks in terms of performing actual visits to websites in order to build up a profile for an imaginary user. In an alternative embodiment, visits to websites may be simulated, such as by directly retrieving ad resources specifically used for tracking users (known as "user sync" resources), with headers and metadata that simulates a visit to the website. Additional alternative techniques will also become apparent to those skilled in the art.

To illustrate the foregoing principle, and returning to FIG. 5, the content retrieval component 530 may also be configured to retrieve content from specified websites and pages, such as webpage 411 served by content provider 410 (FIG. 4). In this embodiment, the content retrieval component 530 may simulate visits to any one or more webpages for the purpose of further accumulating user-specific data related to the webpage 411. In one example, the content retrieval component 530 may select a target geography, and implement a mechanism to simulate requests coming from that geography. The mechanisms may include physical server location, IP address, network topology, and emulated GPS or other geolocation data.

Although it is envisioned that implementations of the preferred embodiment will likely retrieve multiple webpages from a particular website, for simplicity of this discussion, examples will be given in the context of retrieving a single webpage. It should be appreciated that, although described as a single webpage, multiple webpages may be retrieved in like manner.

The profile generator 501 may sample the content provider's website to increase the user-specific data that is retrieved. In the preferred embodiment, sampling may occur by visiting a target web site using a web browser that has native profile or measurement tools, or one that has been modified to provide such functionality. To obtain a wider range of samples, the profile generator 501 invokes one or more profiles 560, such as user profile 561, to simulate visiting the content provider's website by an actual user (although synthetically generated). The requested webpage may be dynamically created and returned in the manner described above in conjunction with FIGS. 1A and 1B.

The profile manager 510 may perform additional actions during or after the webpage is loaded. Such may occur for the purpose of triggering certain events, altering measurement values, or otherwise influencing the behavior of the website or other third parties. This may either occur actively (e.g., via code injection) or passively by waiting for expected events to occur. These subsequent actions may further generate or modify user-specific content.

FIG. 7 is a logical flow diagram 700 generally illustrating operations performed by one specific implementation of a preferred embodiment. The several operations shown in FIG. 7 may be implemented using computing devices, such as the illustrative computing device shown in FIG. 12 and described below. It should be appreciated that the several operations shown in FIG. 7 implement the preferred embodiment, and many other operations may additionally be added. Likewise, some of the operations may be combined or even eliminated without departing from the spirit and scope of the disclosure.

To begin, a browser is initialized with an active synthetic user profile (701). The subject synthetic user profile may be empty or blank when initialized, or it may be an existing synthetic user profile retrieved from prior operations. The browser alters certain attributes or settings to match the target demographic (or persona) for the active synthetic user profile (703). In one example, a user-agent string for the browser may altered to simulate browsing with a different version of the browser, a different browser entirely, or even a different operating system. Additional settings may be spoofed as well, such as screen size (or the like) to simulate execution on a mobile device. In addition, the browser may optionally alter or select parameters based on a particular geography associated with the active synthetic user profile (705).

Once the browser has been configured in accordance with the active synthetic user profile, the browser begins selecting and visiting websites or other resources at URLs associated with the active synthetic user profile (707). By virtue of such visits, user-specific data is accumulated by the browser to approximate the browsing behavior of the target demographic of the active synthetic user profile. The browser may also perform supplemental actions at the visited web site, such as, for example, performing a predetermined or random search at a search engine website. The process 700 iterates (711) until all available resources have been visited by the browser or, potentially, a timeout period has been reached. Once that occurs, the user-specific data is stored in conjunction with the active synthetic profile (713). The process 700 may also repeat if more synthetic user profiles are to be created, such as for additional target demographics, or the like (715). Alternatively, the process 700 may be executed only once. Many other alternatives are equally possible regarding the repeated execution of the process 700. In addition, it should be appreciated that the process illustrated in FIG. 7 is but one preferred embodiment, and many other implementations of this disclosure will become apparent, to those skilled in the art.

With the synthetic user profile(s) created, a number of previously-unavailable options become available. For instance, the synthetic user profiles may be used, in one embodiment, to retrieve ads from an ad network or ad exchange, which are targeted based on one or more attributes of the synthetic user profile. Additional testing and evaluation may then be done on those ads. Similarly, the synthetic user profiles may be used in conjunction with retrieving and analyzing personalized content from a subject website. The synthetic user profiles are particularly useful in such a case where the subject website provides content that is targeted based on one or more attributes of the synthetic user profile. It should be appreciated that in embodiments that use synthetic user profiles in such a manner, the length of time that has passed since a particular synthetic user profile was created may be a significant factor in its effectiveness. Accordingly, the age of the synthetic user profile should be considered when determining whether to use that synthetic user profile. Likewise, an aged synthetic profile may, in fact, be a desirable characteristic in some circumstances.

Monitoring and Policing Online Advertisements

As noted previously, some embodiments of the present disclosure are directed to a system for monitoring and policing online advertisements. Embodiments implement a tool for monitoring ads served on a web site and scoring one or more of the ads. Based on the score of the ads, feedback is reported, such as to a proprietor of the website. In preferred embodiments, the feedback may be used to alter the ads served on the website, in character, in nature, in amount, or the like.

Figure 8:
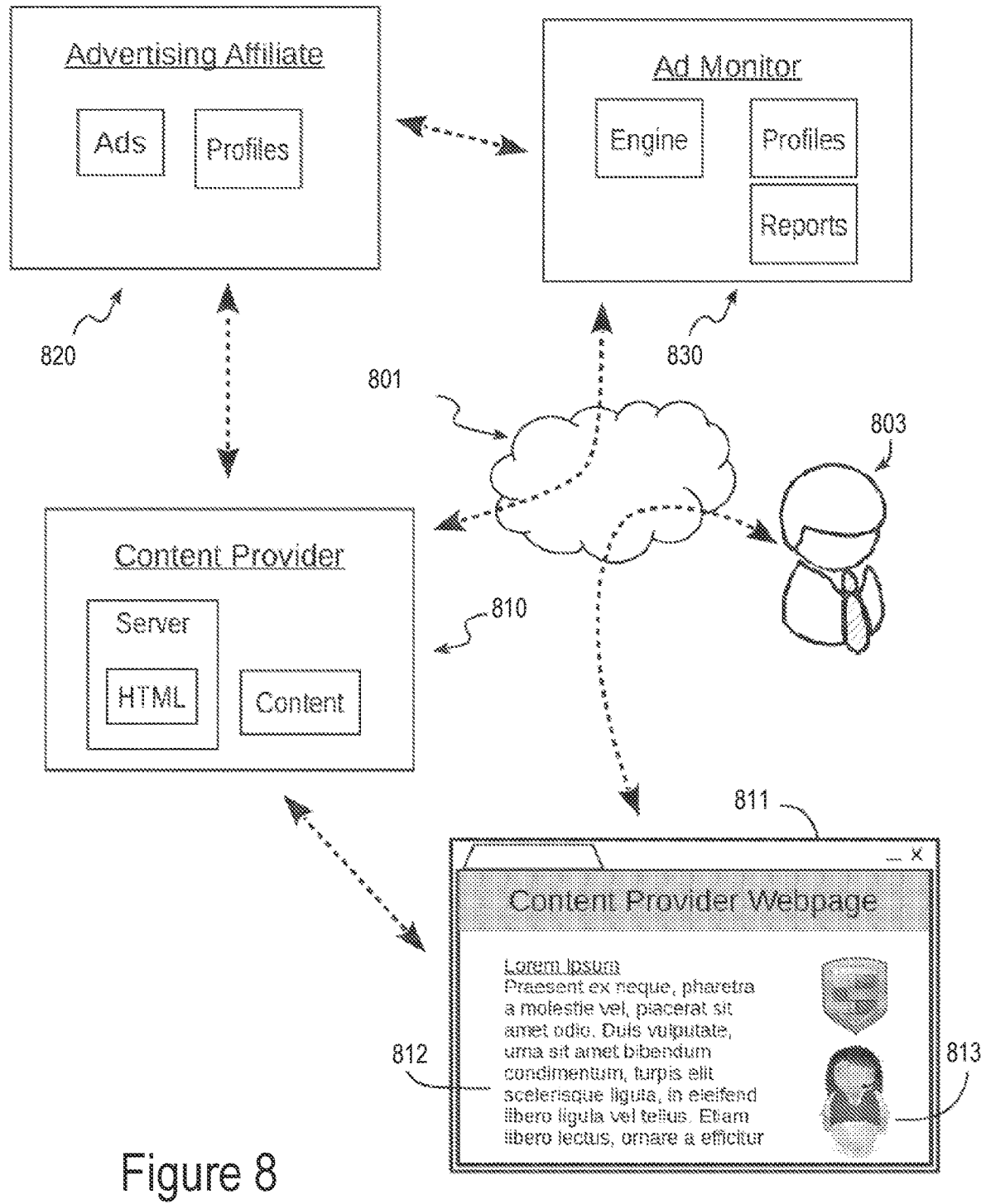
FIG. 8 is a functional block diagram generally illustrating a system for monitoring and policing online advertisements, in accordance with the disclosure.

FIG. 8 is a functional block diagram generally illustrating a tool for monitoring and policing online advertisements. Illustrated are a content provider 810, an advertising affiliate 820, and an ad monitor 830. Generally stated, the content provider 810 includes a web server for serving content, typically in the form of static or dynamic webpages, constructed using languages such as HTML, PHP, Perl, CGI, ASP, or the like. The content provider 810 may serve up one or more webpages, such as webpage 811. In accordance with implementations of this disclosure, the webpage 811 includes code, such as markup language instructions, that defines both content 812 and ads 813. The content 812 is typically provided by the content provider 810. However, the ads 813 are generally provided by the advertising affiliate 820.

The advertising affiliate 820 is typically engaged by the content provider 810 to provide context-sensitive (targeted) ads to be displayed in conjunction with the content 812 on the content provider's web site 811. The advertising affiliate 820 typically selects the appropriate ad for display on the web site 811 from a data store of available ads. The advertising affiliate 820 commonly contracts with various advertisers who provide the ads to the advertising affiliate 820 together with information about the target audience for each ad. Generally, profiles are maintained that associate which type of visitor should receive which types of ads. In other words, a visitor having a particular profile may be more receptive to a particular type of ad, whereas a visitor with a different profile may be more receptive to a different type of ad. Advertising profiles are generally constructed by monitoring the online habits (e.g., browsing history, search history, purchase history, or the like).

Accordingly, when a particular visitor lands at the web site 811, the content provider 810 serves up the webpage 811, but the advertising affiliate makes a determination about which ad (e.g., ad 813) to serve in conjunction with the content 812 from a profile built up of the visitor. Often, the profile is derived from, or influenced by, user-specific data stored on the visitor's computing system. One environment for serving ads based on a user's web browsing history is illustrated in FIGS. 1A-3 as described in detail above. Briefly stated, when the visitor 803 lands on the web site 811, a profile is constructed or evaluated for the visitor 803. That profile is used by the advertising affiliate 820 to select an ad to be served to that visitor 803.

Figure 9:
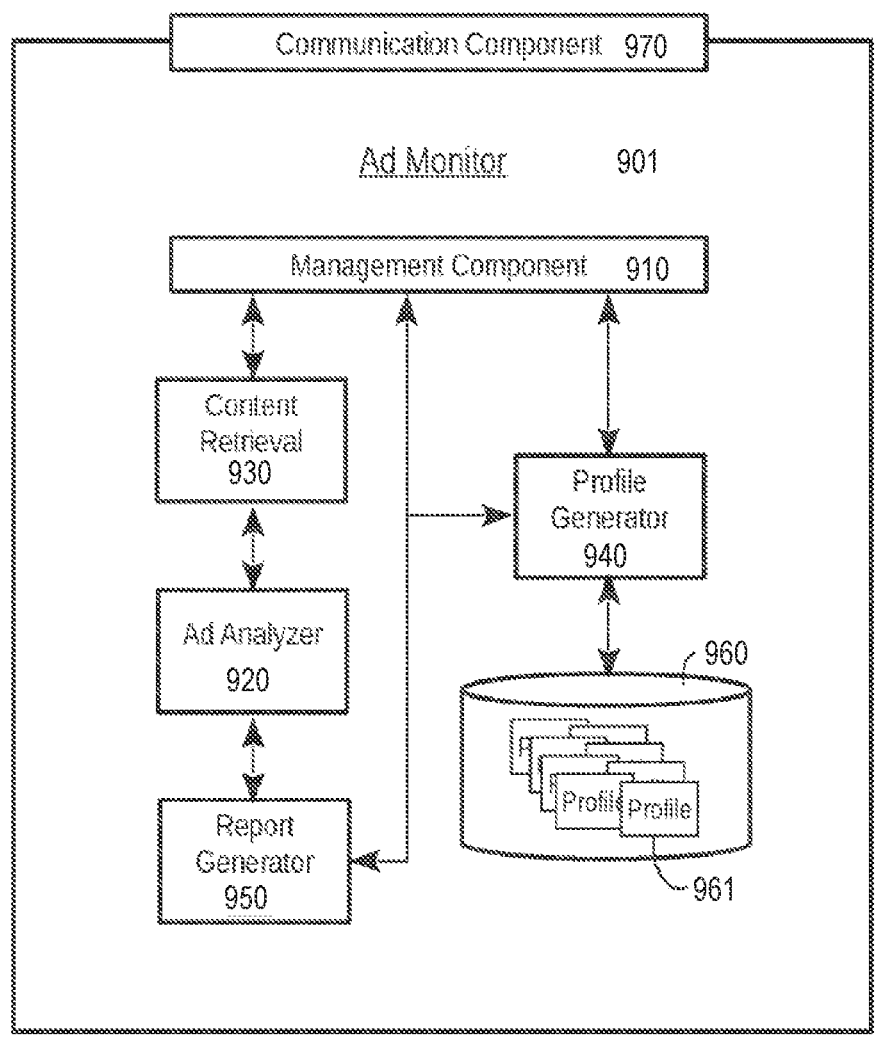
FIG. 9 is a conceptual diagram generally illustrating the creation of a synthetic profile using an ad monitor, constructed in accordance with this disclosure.
Figure 10:
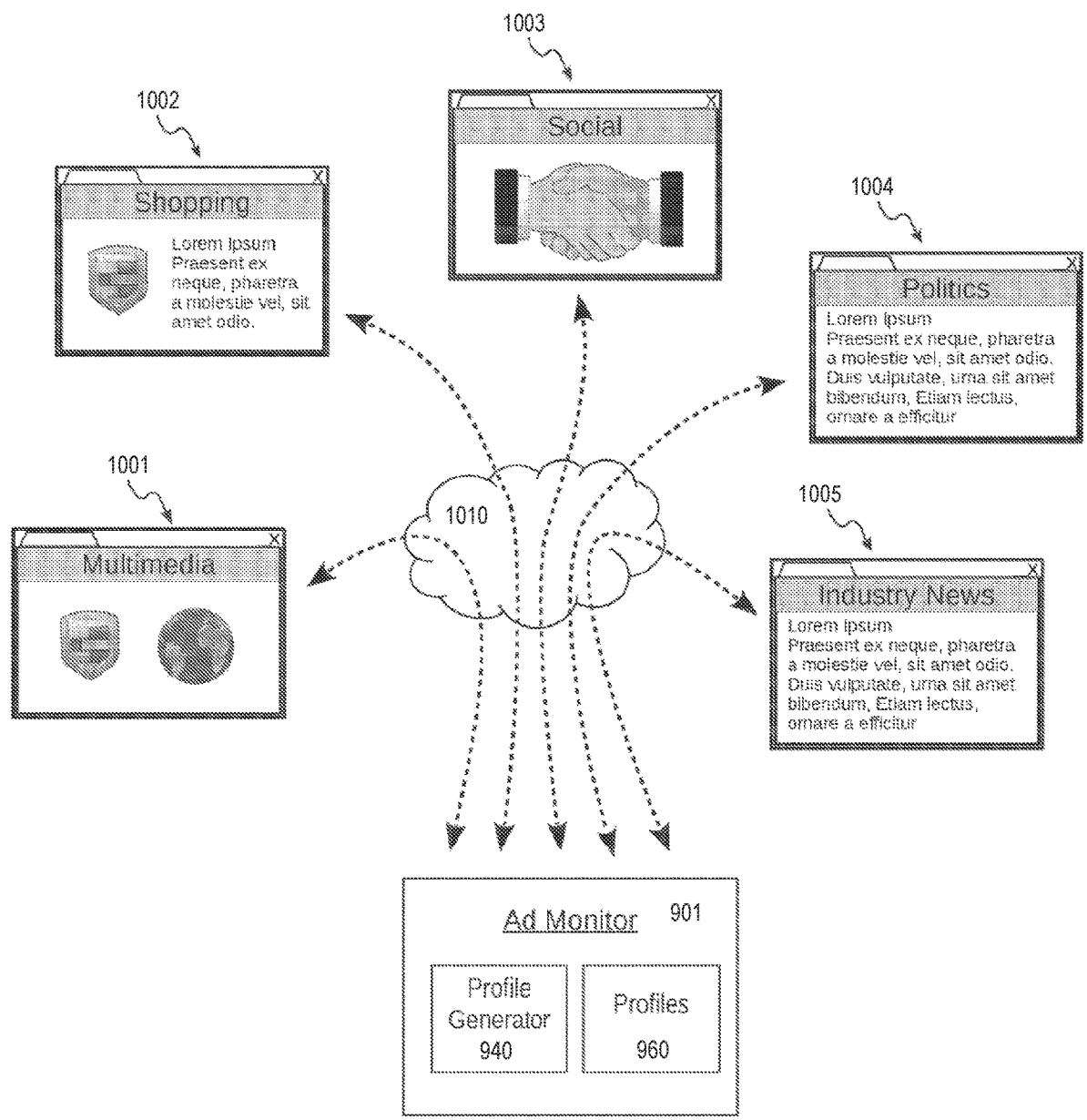
FIG. 10 is a functional block diagram generally illustrating components of an ad monitor constructed in accordance with this disclosure.
Figure 11:
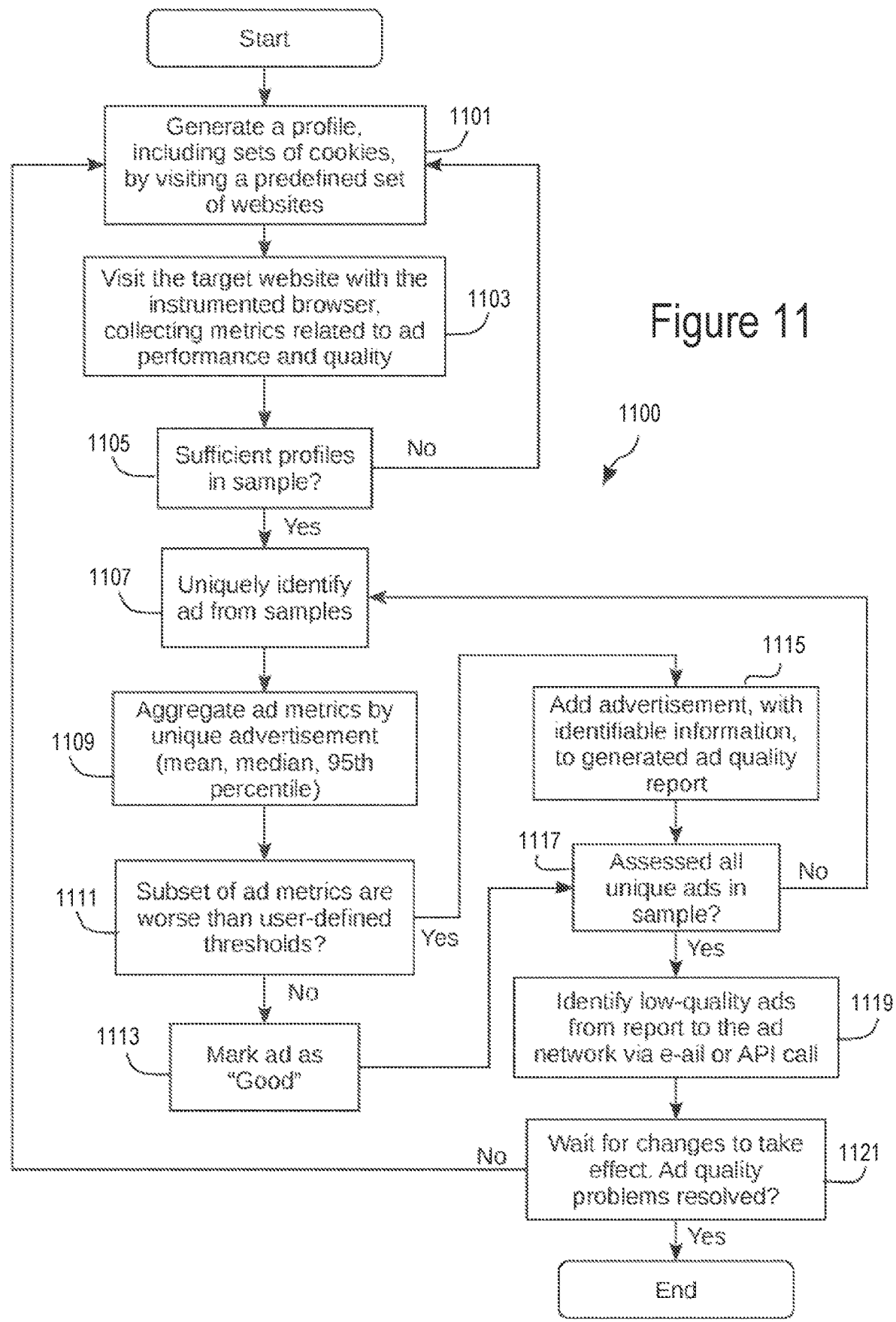
FIG. 11 is a logical flow diagram generally illustrating a system for monitoring and policing online advertisements, in accordance with certain embodiments.

The ad monitor 830 is a tool that, with the cooperation of the content provider 810, evaluates the character of ads being served on the content provider's web site 111. One specific implementation of the ad monitor 830 is illustrated in FIGS. 9 and 10, and described below. Generally described, the ad monitor 830 includes an evaluation engine that manages a process for quantifying the performance and quality of online advertisements. Particular details of the process are illustrated in FIG. 11 and described below. Generally stated, the ad monitor 830 begins by building a pseudo-profile that simulates a member of the content provider's target audience, such as the visitor. The ad monitor 830 may build the pseudo-profile by visiting various sites that ordinary visitors of the content provider's website 811 would be expected to visit. Then, with the pseudo-profile built, the ad monitor 830 visits the webpage 811 and evaluates the ads that are served, such as ad 813. The ad monitor 830 provides feedback concerning the quality of the ads, such as in the form of reports or other actionable information. The ad monitor 830 may programmatically (or alternatively with human intervention) notify the advertising affiliate and/or the content provider about ads that are troubling or otherwise of an inadequate quality or inappropriate content. In this way, the advertising affiliate 820 and/or the content provider 810 may take appropriate remedial steps.

Any one or more of the several entities illustrated in FIG. 8 may communicate over the Internet 801 or other publicly accessible wide area network. Although illustrated in quasi-human form, it should be appreciated that the visitor 803 represents a computing device in use by one or more individuals. The computing device may host user-specific data or information, such as cookies, which represents a profile for the individual or individuals. Finally, the several components illustrated in FIG. 8 may be implemented using computing devices, which are generally known. One illustrative computing device that may be used to implement embodiments is illustrated in FIG. 12 and described below.

The several components illustrated in FIG. 8 implement one preferred embodiment for evaluating the nature of affiliate-served ads. Such an embodiment adds value to the content provider 810 by providing feedback on the quality and appropriateness of affiliate-served ads to the content being served by the content provider 810. What follows now is a discussion of additional detail for specific implementations of several of the components introduced in FIG. 8.

Turning now to FIG. 9, illustrated is one embodiment of an ad monitor 901 which may be used in various implementations of this disclosure. The preferred embodiment of the ad monitor 901 includes a management component 910, a communication component 970, an ad analyzer 920, a profile generator 940, a report generator 950, and a plurality of synthetic profiles 960. The communication component 970 may be any component that facilitates communication between disparate computing devices, such as over a local or wide area network, or the like. In one example, the communication component 970 enables communication between the ad monitor 901 and a remote content provider using at least the HTTP communication protocol. A management component 910 is configured to facilitate inter-process cooperation and proper operation. The management component 910 may also be configured with logic to schedule and marshal various events and tasks among the several components of the ad monitor 901. The management component 910 of the preferred embodiment may further include administrative control functions.

The profile generator 940 is configured to create and manage a plurality of synthetic user profiles 960, such as profile 961. In this embodiment, each profile 960 represents a fabricated browsing history of an imaginary individual. In this embodiment, the profile generator 940 is configured to simulate the browsing habits of a real person by performing a multiplicity of activities to simulate an imaginary person performing various activities, such as browsing or searching, the Internet. Each of the several profiles may represent the browsing habits of different types of real people.

To illustrate the foregoing, and referring briefly to FIG. 10, the ad monitor 901 performs a multiplicity of browsing sessions by visiting numerous other websites (e.g., websites 1001-1005). The profile generator 940 is configured to access each of the websites using browsing software that accumulates user-specific data from each website. For instance, the profile generator 940 may visit website 1001, which may be a multimedia rich website with lots of content pertaining to entertainment, for example. By visiting website 601, the profile generator 940 accumulates whatever cookies and other user-specific data may be set by website 1001. Profile generator 940 may also visit website 1004, which may be a blog site having political content affiliated with a particular political party, for example. Accordingly, the profile generator 940 accumulates whatever user-specific data may be set by website 1004. The profile generator 940 repeats this behavior for numerous different and varying websites having different and varying characteristics and, thereby, accumulates user-specific data corresponding to a particular browsing history or pattern. The user-specific data accumulated during such browsing session is stored in a specific profile 960.

The profile generator 940 may repeat the foregoing operations to generate different user profiles. In one embodiment, the visited websites may be selected via a variety of means, including random sampling of top web sites, or targeted based on a particular demographic group. Alternatively or additionally, the visited websites may be selected to simulate the expected browsing habits of a target demographic. For example, the ad monitor 901 may be tasked with creating one user profile simulating the browsing characteristics of a mature individual and another user profile simulating the browsing characteristics of a young adult. In such a scenario, different browsing criteria may be specified to generate different profiles. For instance, a young adult may be more likely to visit a social network website 1003 and a multimedia website 1001, whereas a mature individual may be more interested in an industry news website 1005 and a political blog 1004. However, similarities are also likely. For instance, both individuals may also be interested in a shopping website 1002. Accordingly, different user profiles 960 may be generated by specifying different browsing patterns which the profile generator 940 may execute.

The foregoing discussion speaks in terms of performing actual visits to websites in order to build up a profile for an imaginary user. In an alternative embodiment, visits to websites may be simulated, such as by directly retrieving ad resources specifically used for tracking users (known as "user sync" resources), with headers and metadata that simulates a visit to the website. Additional alternative techniques will also become apparent to those skilled in the art.

Returning now to FIG. 9, the content retrieval component 930 is configured to retrieve content from specified websites and pages, such as webpage 811 served by content provider 810 (FIG. 8). The content retrieval component 930 visits any one or more webpages, such as on behalf of the content provider 810, for the purpose of evaluating content (e.g., affiliate ads) rendered on the webpage 811. In one specific implementation, the content provider 810 requests one or more identified webpages or unidentified webpages within an identified website or domain. Although it is envisioned that implementations of the preferred embodiment will likely retrieve and evaluate multiple webpages from a particular website, for simplicity of this discussion, examples will be given in the context of retrieving a single webpage. It should be appreciated that, although described as a single webpage, multiple webpages may be retrieved in like manner.

The content retrieval component 930 may sample the content provider's website to increase the number of ads that are retrieved. In the preferred embodiment, sampling may occur by visiting the target website using a web browser that has native profile or measurement tools, or one that has been modified to provide such functionality. To obtain a wider range of samples, the content retrieval component 930 invokes one or more profiles 960, such as user profile 961, to simulate visiting the content provider's website by an actual user (although synthetically generated).

The requested webpage may be dynamically created and returned in the manner described above in conjunction with.

FIGS. 1A and 1B. The returned webpage is then passed to an ad analyzer 920 which performs an analysis of the quality or appropriateness of at least a portion of the returned webpage. In one example, the portion analyzed is an affiliate ad served as part of the webpage. In other words, the analyzed portion may be the external ad 177 (FIG. 1B) in this example. In another example, the portion analyzed is an ad or other resource served by the content provider itself, such as multimedia content 115 (FIG. 1A).

There are many types of analyses which may be performed on the webpage portion to compute a quality score. Various combinations of the following analyses are implemented in various embodiments, with most of these analyses being implemented in the preferred embodiment. For the purpose of the following discussion, the analyzed portion is an affiliate ad, although other external content may be analyzed in a similar manner. Certain embodiments may use direct measurement of individual resources within an ad. However, alternative embodiments may measure an iframe as a proxy for directly measuring the ad.

The preferred embodiment produces measurement metrics for an ad based on one or more of the following criteria:

1. CPU Time—Producing an aggregate total (or other summary statistic) by using measurements of the ads. These measurements may be provided natively by the web browser, or determined by other code profiling mechanisms. The profiling mechanisms include one or more of the following: the wallclock time of individual function calls comprising ad load; the thread clock time of individual function calls comprising ad load; the longest non-yielding call, with respect to either wallclock or threadclock time; or the like.

2. Network Transfer Data—Using an aggregate total, other summary statistic, or distribution of the number of bytes in a network request or response, the number of resource requests made, the number of resource requests fetched from the browser cache instead of the network, the number of resource requests resulting in errors (either in aggregate, or by error code).

3. Animation Load—An animation load metric may be computing based on the total number of compositing or paint events either as a direct measurement or as a proxy for CPU time. This number can be based on one or both of the following criteria: high-frequency repaint events and CSS animation frames, occurring either in the browser's main thread or in a separate compositing or rendering thread.

4. Tracker Load—A tracker load value may be computed based on the number of "tracking pixels" or likely tracking scripts. In one implementation, this value may be produced by counting the number of resource requests determined to be likely trackers. Identification of trackers may be rule-based or statistical, and may be performed using either individual, or weighted combinations of rules. Illustrative rules that may be implemented may be based on mime types or file extensions identifying an asset as an image, missing mime types, plain text responses, small response payload sizes, response payload sizes matching exactly "known values" for tracking pixels, or the like.

5. Rich Media—A rich media score may be quantified to estimate the presence of rich media through static analysis of the ad, inspecting the file type or size of downloaded assets, inspecting measurements, or the like.

6. Secured Resource Requests—A secured resource metric may be quantified base on either the number, or proportion of, secured (SSL-enabled) requests. Non-encrypted ad resources are not eligible for HTTP2 and may actually be a detriment to performance.

7. Malware Detection—One scoring criterion may be based on an analysis of the analyzed portion for the presence of malicious code, such as "malware," spyware," "adware," or the like.

The ad analyzer 920 thus creates an "ad score" which represents a quality value for the ad. Although introduced in the singular, in should be appreciated that the "ad score" may in fact be a plurality of individual scores, a cumulative score of each of one or more of the aforementioned evaluations, a weighted average of one or more such evaluations, any combination of these, or some other value or values based on one or more of the qualitative evaluations described above. The preferred embodiment produces an overall quality score based on one or more of those evaluations, using one or more methods, including but not limited to a rules-based engine, a statistical method, a predictive model, or any combination of these. For simplicity of discussion, the term "ad score" will be treated as a singular score although it should be appreciated that in practice such "ad score" may, and likely will, be composed of multiple constituent values.

Once the ad score for a particular ad has been generated, the ad analyzer 920 passes the ad score off to the report generator 950. The report generator 950 formulates a response, which may be a no-response, based on the ad score and criteria provided by the content provider. The response may take one or more of very many different forms. Certain reports will be discussed here by way of example only, and many other types of reports or reporting functions are possible.

In one embodiment, the report generator 950 formulates a report based on the "quality" of ads served in conjunction with the content provider's content. More specifically, the report generator 950 may compare the ad score for a particular ad or set of ads against a given criteria. Any ads which do not satisfy the given criteria are reported as being "bad." For the purpose of this discussion, the term "bad" indicates that the subject ad fails the given criteria. Again, failing the given criteria may be the result of a single metric falling below said criteria, a plurality of metrics falling below multiple criteria, or one or more metrics falling below an average, weighted average, or the like. Identifying an ad as "bad" may be accomplished in many ways, as will be understood by those skilled in the art.

For any one or more ads identified as bad, the report generator 950 may issue a notification of such either to the content provider 810, the advertising affiliate 820, to some third-party, or to any combination of these. The notification may take the form of an automated request to prevent any bad ads from being served in conjunction with the content provider's website. In one specific implementation, such a request may take the form of an automated e-mail, a reporting webpage, an API call to the advertising affiliate 820, or the like.

FIG. 11 is a logical flow diagram 1100 generally illustrating operations performed by one specific implementation of a preferred embodiment. The several operations shown in FIG. 7 may be implemented using computing devices, such as the illustrative computing device shown in FIG. 12 and described below. It should be appreciated that the several operations shown in FIG. 11 implement the preferred embodiment, and many other operations may additionally be added. Likewise, some of the operations may be combined or even eliminated without departing from the spirit and scope of the disclosure.

To begin, a user profile is generated (1101) by visiting a predefined set of websites. The user profile includes at least website cookies that represent the websites visited. The target website is then visited (1103) using an instrumented browser. The instrumented browser includes the user profile generated at step 1101. The instrumented browser collects metrics related to ad performance and quality.

If a sufficient number of samples of the target website have not yet been collected, the process repeats until a sufficient number of samples have been collected (1105). With sufficient samples, ads are uniquely identified from the sampled websites (1107). The ads are uniquely identified so that individual ads may be evaluated and scored in an actionable manner. In one embodiment, uniquely identifying an ad may be accomplished based on the URL or payload of the retrieved resources. In one specific implementation, the following techniques may be implemented to generate a unique identifier for an ad:

1. Performing machine learning on the URIs or payload of the associated resources. Example inputs may include the HTML of an ad, or extracted features including the image source URL, iframe source URL, link anchor URLs, or SWF object references, for example.

2. For each URL, this may include tokenizing or otherwise deconstructing the URL to create features suitable for machine learning.

3. Identification techniques may include clustering approaches, neural networks, generating regular expressions to extract key metadata.

Once ads are uniquely identified, ad metrics for each unique ad are aggregated (1109). If one or more ads reflect ad metrics which that worse than some pre-defined threshold, those ads are identified (1111). Any ads which do not fail the pre-defined threshold are marked "good" (1113) and those that do fail the pre-defined threshold are added to a list of reportable ads, together with sufficient information to uniquely identify the ad (1115). Once all the ads have been evaluated (1117), any low-quality ads are reported to the entity requesting such notification (1119). Such notification may take the form of an email, API call, human-generated report, or the like.

The process may await confirmation that the low-quality ads have been resolved or otherwise handled (1121). The process may iterate a number of times or continuously for so long as is deemed necessary. For instance, a content provider may subscribe for an ad monitoring service, or the like. Alternatively, the process illustrated in FIG. 11 may be executed only once. Many other alternatives are equally possible regarding the repeated execution of the process 1100. In addition, it should be appreciated that the process illustrated in. FIG. 11 is but one preferred embodiment, and many other implementations of this disclosure will become apparent to those skilled in the art.

Example Computing Device

FIG. 12 is a functional block diagram generally illustrating one possible example of a computing device 1200 that may be used to implement various embodiments. As shown, computing device 1200 includes several functional components to enable generation of synthetic user profiles and/or policing online advertisements. The example computing device may be implemented as one or more of any number of devices, such as a mobile phone, a tablet computer, a personal digital assistant, a notebook or ultrabook computer, a desktop computer, a server computer, a virtual machine, or the like.

The computing device 1200 may include a processor 1212, a memory 1214, communication circuit 1216, transceiver 1218, audio processing circuit 1220, user interface 1222, image sensor 1232, image processor 1234, and optical system 1250. Processor 1212 controls the operation of the computing device 1200 according to programs stored in program memory 1214. The communication circuit 1216 interfaces the processor 1212 with the various other components, such as the user interface 1222, transceiver 1218, audio processing circuit 1220, and image processing circuit 1234. User interface 1222 may include a keypad 1224 and a display 1226. Keypad 1224 allows the operator to key in alphanumeric characters, enter commands, and select options. The display 1226 allows the operator to view output data, such as entered information, output of the computing device 1200, images or other media, and other service information. In certain computing devices, the user interface 1222 combines the keypad 1224 and the display 1226 into a touchpad display.

The computing device 1200 may also include a microphone 1228 and speaker 1230 though certain computing devices may not have such features. Microphone 1228 converts sounds into electrical audio signals, and speaker 1230 converts audio signals into audible sound. Audio processing circuit 1220 provides basic analog output signals to the speaker 1230 and accepts analog audio inputs from the microphone 1228. Transceiver 1218 is coupled to an antenna 1236 for receiving and transmitting signals on a suitable communications network (not shown).

Image sensor 1232 captures images formed by light impacting on the surface of the image sensor 1232. The image sensor 1232 may be any conventional image sensor 1232, such as a charge-coupled device (CCD) or complementary metal oxide semiconductor (CMOS) image sensor. Additionally, the image sensor 1232 may be embodied in the form of a modular camera assembly with or without an integrated optical system 1250. Image processor 1234 processes raw image data collected by the image sensor 1232 for subsequent output to the display 1226, storage in memory 1214, or for transmission by the transceiver 1218. The image processor 1234 is a signal microprocessor programmed to process image data, which is well known in the art. A position sensor 1280 detects the position of the computing device 1200 and generates a position signal that is input to the microprocessor 1212. The position sensor 1280 may be a Global Positioning System sensor, potentiometer, or other measuring device known in the art of electronics.

CONCLUSION

Other embodiments may include combinations and sub-combinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, "feature" or "features" can refer to structures and/or functions of an apparatus, article of manufacture or system, and/or the steps, acts, or modalities of a method.

In the foregoing description, numerous details have been set forth in order to provide a sufficient understanding of the described embodiments. In other instances, well-known features have been omitted or simplified to not unnecessarily obscure the description.

A person skilled in the art in view of this description will be able to practice the disclosed invention. The specific embodiments disclosed and illustrated herein are not to be considered in a limiting sense. Indeed, it should be readily apparent to those skilled. In the art that what is described herein may be modified in numerous ways. Such ways can include equivalents to what is described herein. In addition, the invention may be practiced in combination with other systems. The following claims define certain combinations and subcombinations of elements, features, steps, and/or functions, which are regarded as novel and non-obvious. Additional claims for other combinations and subcombinations may be presented in this or a related document.

The invention claimed is:

1. A method for evaluating online advertisements, the method comprising:
   generating a first synthetic user profile by:
      configuring a browser in accordance with first attributes; and
      accumulating, via the browser configured in accordance with the first attributes, first user-specific data associated with a first plurality of resources;
   generating a second synthetic user profile by:
      configuring a browser in accordance with second attributes different from the first attributes; and
      accumulating, via the browser configured in accordance with the second attributes, second user-specific data associated with a second plurality of resources, the second plurality of resources differing at least in part from the first plurality of resources associated with the first synthetic user profile;
   retrieving, in a first instance, a target webpage via a browser configured in accordance with the first synthetic user profile, the target webpage comprising internal content and dynamic content;
   retrieving, in a second instance, the target webpage via a browser configured in accordance with the second synthetic user profile; and
   evaluating first dynamic promotional content retrieved via the first instance and second dynamic promotional content retrieved via the second instance to assign a first score to the first dynamic promotional content and a second score to the second dynamic promotional content.

2. The method of claim 1, further comprising, based at least in part on the evaluation of the dynamic content:
   identifying an affiliate associated with the first dynamic promotional content; and
   automatically requesting further dynamic content associated with the affiliate be prevented from being served in conjunction with the target webpage.

3. The method of claim 1, further comprising automatically generating a report comprising:
   a record of the first dynamic promotional content;
   the first score assigned to the first dynamic promotional content;
   a record of the second dynamic promotional content; and
   the second score assigned to the second dynamic promotional content.

4. The method of claim 3, further comprising automatically providing the report to a user.

5. The method of claim 1, wherein the first dynamic promotional content in the first instance is a first advertisement, and wherein the second dynamic promotional content in the second instance is a second advertisement different from the first advertisement.

6. The method of claim 1, wherein the first attributes comprise one or more of: a browser type, a browser version, an operating system, or a geographical location.

7. The method of claim 1, wherein accumulating user-specific data comprises accumulating and storing one or more of: cookies, web beacons, flash cookies, user-agent stringers, or referrer headers.

8. The method of claim 1, wherein evaluating the first dynamic promotional content comprises assessing one or more of:
   time to load the first dynamic promotional content;
   data used to load the first dynamic promotional content;
   animation load associated with the first dynamic promotional content;
   number of trackers associated with the first dynamic promotional content;
   rich media content associated with the first dynamic promotional content;
   secured resource requests associated with the first dynamic promotional content; or
   malicious code associated with the first dynamic promotional content.

9. A tangible, non-transitory computer-readable medium storing instructions that, when executed by one or more processors, cause the one or more processors to perform operations comprising:
   generating a first synthetic user profile by:
      configuring a browser in accordance with first attributes; and
      accumulating, via the browser configured in accordance with the first attributes, first user-specific data associated with a first plurality of resources;
   generating a second synthetic user profile by:
      configuring a browser in accordance with second attributes different from the first attributes; and
      accumulating, via the browser configured in accordance with the second attributes, second user-specific data associated with a second plurality of resources, the second plurality of resources differing at least in part from the first plurality of resources associated with the first synthetic user profile;
   retrieving, in a first instance, a target webpage via a browser configured in accordance with the first synthetic user profile, the target webpage comprising internal content and dynamic content;
   retrieving, in a second instance, the target webpage via a browser configured in accordance with the second synthetic user profile; and
   evaluating first dynamic promotional content retrieved via the first instance and second dynamic promotional content retrieved via the second instance to assign a first score to the first dynamic promotional content and a second score to the second dynamic promotional content.

10. The computer-readable medium of claim 9, wherein the operations further comprise, based at least in part on the evaluation of the first dynamic promotional content:
    identifying an affiliate associated with the first dynamic promotional content; and
    automatically requesting further dynamic content associated with the affiliate be prevented from being served in conjunction with the target webpage.

11. The computer-readable medium of claim 9, wherein the operations further comprise automatically generating a report comprising:
    a record of the first dynamic promotional content;

the first score assigned to the first dynamic promotional content;

a record of the second dynamic promotional content; and the second score assigned to the second dynamic promotional content.

12. The computer-readable medium of claim 11, wherein the operations further comprise automatically providing the report to a user.

13. The computer-readable medium of claim 9, wherein the first dynamic promotional content in the first instance is a first advertisement, and wherein the second dynamic promotional content in the second instance is a second advertisement different from the first advertisement.

14. The computer-readable medium of claim 9, wherein the first attributes comprise one or more of: a browser type, a browser version, an operating system, or a geographical location.

15. The computer-readable medium of claim 9, wherein accumulating user-specific data comprises accumulating and storing one or more of: cookies, web beacons, flash cookies, user-agent stringers, or referrer headers.

16. The computer-readable medium of claim 9, wherein evaluating the second dynamic promotional content comprises assessing one or more of:

time to load the second dynamic promotional content;

data used to load the second dynamic promotional content;

animation load associated with the second dynamic promotional content;

number of trackers associated with the second dynamic promotional content;

rich media content associated with the second dynamic promotional content;

secured resource requests associated with the second dynamic promotional content; or malicious code associated with the second dynamic promotional content.

17. A system comprising:

one or more processors; and the computer-readable medium of claim 9.

* * * * *